May 29, 1956 P. CALVI 2,747,460
IMAGE COMBINING MEANS FOR COLOR TELEVISON APPARATUS
Filed July 15, 1952
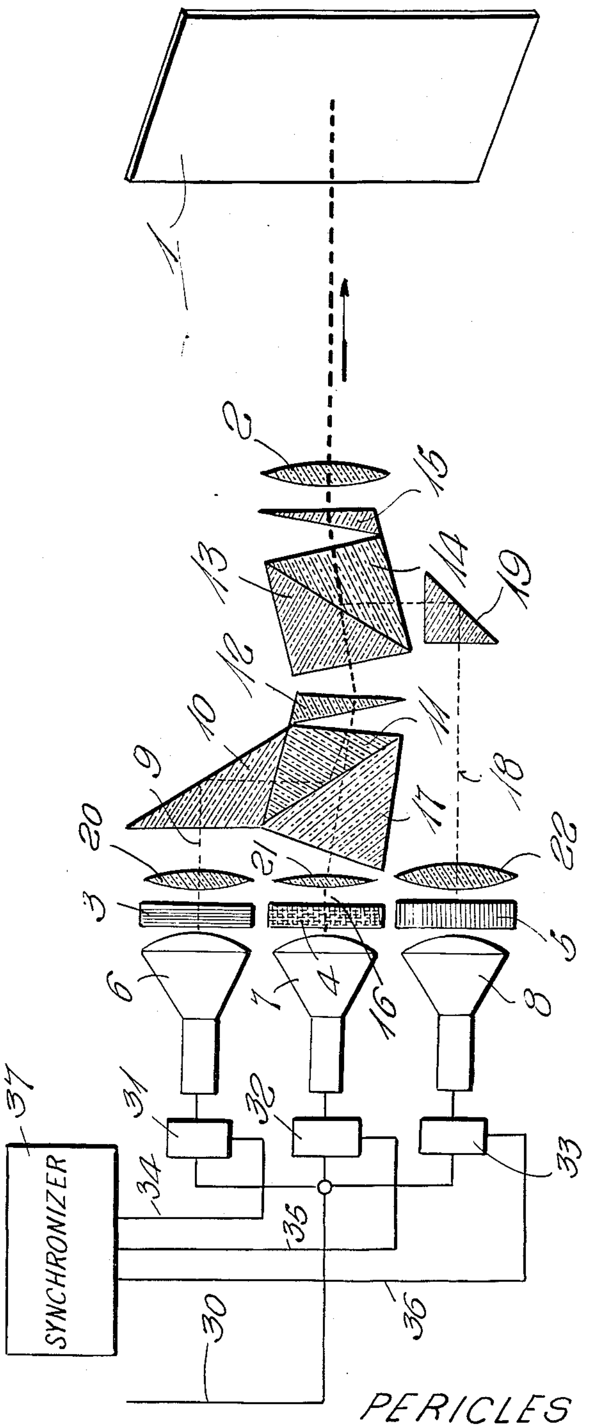
INVENTOR
PERICLES CALVI,
BY Felix A. Russell
ATTORNEY United States Patent Office 2,747,460

Patented May 29, 1956

2,747,460

IMAGE COMBINING MEANS FOR COLOR TELEVISION APPARATUS

Pericles Calvi, Buenos Aires, Argentina

Application July 15, 1952, Serial No. 298,973

2 Claims. (Cl. 88—24)

The present invention relates to television receivers, and more particularly to receivers of this character which are adapted to reproduce images in color upon a projection screen.

It is common practice to transmit a color picture signal which will produce a black and white image when reproduced by a conventional television receiver. This picture signal, however, comprises color information obtained by the use of color filters in the optical system of the television camera.

The picture signal transmitted will have color information contained therein which consists of a weighting of the intensity of the elements of the picture signal in accordance with the color of corresponding elements of the scanned image of the object.

Receivers for the reproduction of the color image comprise means in the optical system of the receiver in synchronism with the filter sequence at the transmitter. Conventional means are employed to obtain this color filter sequence, such as a revolving disc, for example.

An object of the invention is the provision of an optical system in which three primary monochromatic images, after the interposition of suitable color filters, may be combined in superposed relationship upon a common viewing surface by means of a common objective lens to reproduce the image in natural color.

Correction lens means are included in the optical system to compensate for the different effective lengths of the optical paths from the several images to the objective lens in order that accurate focusing of the superposed images may be obtained.

A further object of the invention is the provision of a receiver of this character suitable for use in the reproduction of the images upon a projection screen.

Other and further objects of the invention will become apparent from a reading of the following specification taken in conjunction with the drawing, in which:

The single figure is a diagrammatic representation of an embodiment of the invention.

In the drawing, a projection screen 1 is suitably positioned before an objective lens 2 for the projection of the color image upon the screen 1.

The optical system comprises three color filters 3, 4 and 5 each positioned respectively before an individual image reproducing device. The image reproducing devices are shown diagrammatically as the three picture tubes 6, 7 and 8, respectively, having effectively parallel coplanar image surface.

The three color filters 3, 4 and 5 may be arranged for the three primary colors, red, yellow and blue, respectively, or they may be arranged for any other desired combination of colors which will operate satisfactorily to obtain the desired color reproduction. In any event, they correspond to the color filters interposed in the optical system of the television camera.

The images from each of the image reproducing devices is arranged to focus at the same portion of the screen by means of a system of lenses and prisms, so that the three images would coincide if simultaneously projected upon the screen.

Considering the red image from the filter 3 positioned before the picture reproducing device 6, a red ray designated 9 passes through a reflecting prism 10 where it is deflected through an angle of approximately 90° and thence passes toward the center of the optical system and through another reflecting prism 11 where it is deflected through a further angle of approximately 90° toward the projection screen 1. From the reflecting prism 11 it passes through a wedge shaped prism 12, a pair of prisms 13—14 which act as a combined reflecting and refractive prism, and a further wedge shaped prism 15 to the common objective lens 2 which focuses the image upon the projection screen 1. The light from picture reproducing device 6 is thus brought into substantial alignment with the optical axis of the objective lens means 1, although the picture reproducing device 6 is displaced from alignment therewith.

The yellow image from the filter 4 comprises a yellow ray 16 corresponding in its position within the image to the red ray 9. The yellow ray 16 passes through a prism 17 which is one of a pair of prisms 17—11, and through the pair of prisms 17—11 the wedge shaped prism 12, the pairs of prisms 13—14, and the wedge shaped prism 15 to the objective lens 2 which focuses the image upon the projection screen. It will be noted that the pair of prisms 11—17 acts as a combined reflecting and refractive prism and that red ray 9 leaves the combined prism along with the yellow ray 16 in substantial alignment with the optical axis of the objective lens 2. The picture reproducing device 7 is in substantial alignment with the optical axis of objective lens 2 so that no reflecting prism such as prism 10 is required for the yellow ray 16.

The blue image from the filter 5 comprises a blue ray 18 which corresponds in its position within the image to the red ray 9 and the yellow ray 16. The blue ray 18 passes through a reflecting prism 19 by which it is deflected through an angle of approximately 90° toward the center of the optical system and thence through the prism 14 of the pair of combined reflecting and refractive prisms 13—14 which in this instance acts as a reflecting prism, deflecting the blue ray 18 through a further angle of approximately 90° toward the projection screen 1. The blue ray 18 then passes through the objective lens 2 to the projection screen 1. It will be observed that the three combined rays 9, 16 and 18, as they leave the combined reflecting and refractive prism 13—14 are in substantial alignment with the optical axis of the objective lens 2, but are angularly displaced from parallelism with respect thereto. The wedge-shaped prism 15 bends the combined rays into true alignment with the optical axis of the objective lens 2.

From the foregoing, it is apparent that each of the three rays 9, 16 and 18 travels through a different path, the three paths converging in the prism 14. The lengths of these paths are different, and they comprise different lengths through air and through glass up to the point where they converge.

In order to equalize the different paths, three compensating lenses 20, 21 and 22 are positioned respectively before the three color filters 3, 4 and 5. These lenses 20, 21 and 22 are shown illustratively as convex lenses of differing thicknesses which give them different focal lengths such that the differences among the three ray paths are equalized. Obviously these compensating differences in focal length may be incorporated in concave lenses or in any lenses of the optical system which are individual to each of the three rays 16, 9 and 18.

The picture signal comprising the color information is received over a suitable transmission path 30 and at an appropriate transmission level for reproduction by the image reproducing devices 6, 7 and 8. The image reproducing devices 6, 7 and 8 are provided with the usual sweep circuits and other circuits which have been omitted for simplicity of illustration.

The picture signal from the transmission path 30 is applied simultaneously to three control devices 31, 32 and 33 which operate to control the application of the signal to the image reproducing devices 6, 7 and 8, respectively. The control devices 31, 32 and 33 are interconnected by control paths 34 and 35 and 36, respectively, to a master synchronizing control device 37.

The three control devices 31, 32 and 33 may comprise gating circuits which successively connect their respective image reproducing devices 6, 7 and 8 for response to the incoming signal of the transmission path 30. The three control devices and their respective gating circuits are shown connected by the control paths 34, 35 and 36 to the master synchronizing control in such manner that appropriate potentials are applied over these control paths to the respective gating circuits consecutively rendering image reproducing devices 6, 7 and 8 operative in synchronism with the sequence of the color filters at the camera.

The master synchronizing device may comprise, for example, a frequency stabilized generator operating to energize a three phase circuit, the potentials of the three phases being applied individually to each of the gating circuits. In instances where the filters at the camera are interposed in the optical system thereof by a revolving color disc, the wave shapes of each of the three phases may be appropriately modified to take care of the period when picture areas of two different colors are simultaneously involved with a moving dividing line between them. During this transition interval the gating circuits may be so controlled that the effect of the dividing line is precisely followed in the image producing devices during a portion of each horizontal sweep and allowing another of the image reproducing devices to operate during such suppressed portion.

It will be apparent that, in lieu of the conventional television transmitting system wherein color filters are used in conjunction with a camera, that my invention will be equally useful with other systems of television transmission as, for example, a "panchromatic" system wherein no color filters are used.

While but one form of the invention has been shown and described herein, it will be readily apparent to those skilled in the art that many minor modifications may be made without departing from the spirit of the invention or the scope of the appended claims.

What is claimed is:

1. In an image projection system, in combination with means for producing a plurality of adjacent images on substantially parallel and coplanar surfaces, a common viewing surface on which all of said images are to be projected in superposed relationship, and a common objective lens means for focusing all of said images on said viewing surface, said objective lens having an optical axis directed toward said viewing surface and substantially normal to said coplanar surfaces, said axis being displaced from alignment with one of said surfaces and in substantial alignment with another one of said surfaces, the provision of image combining means including at least one reflecting prism disposed to direct light from said displaced one of said coplanar surfaces toward said optical axis of said objective lens means, combined reflecting and refractive prism means disposed substantially in alignment with said optical axis and positioned to receive light from said reflecting prism and to direct said light toward said objective lens means combined with light from said aligned one of said coplanar surfaces in a direction angularly displayed from parallelism with said axis, wedge-shaped prism means interposed between said combined prism means and said objective lens means, said wedge-shaped prism means bending light from said combined prism means into true alignment with said axis, and compensating lens means included in at least one optical path from one of said coplanar surfaces to said objective lens means, said compensating lens means being included in a portion of said optical path individual to said last-named one of said coplanar surfaces, said compensating lens means being dimensioned to correct for the difference between the effective length of the optical path in which said compensating lens means is included and another optical path from another of said coplanar surfaces to said objective lens means.

2. The combination according to claim 1 further comprising color filter means included in each optical path from each of said coplanar surfaces to said objective lens means, said color filter means each passing a different component primary color for said projected image and each being included in a portion of said optical path individual to one of said coplanar surfaces.

References Cited in the file of this patent

UNITED STATES PATENTS

| | | |
|---|---|---|
| 944,787 | Jumeaux | Dec. 28, 1909 |
| 1,320,625 | Kunz | Nov. 4, 1919 |
| 1,328,291 | Parker | Jan. 20, 1920 |
| 1,599,718 | Roach | Sept. 14, 1926 |
| 2,315,783 | Gilmore | Apr. 6, 1943 |
| 2,389,646 | Sleeper | Nov. 27, 1945 |
| 2,465,652 | Legler | Mar. 29, 1949 |
| 2,560,168 | Goldsmith | July 10, 1951 |
| 2,589,930 | Dimmick et al. | Mar. 18, 1952 |
| 2,600,590 | Thomas | June 17, 1952 |
| 2,621,245 | Kell | Dec. 9, 1952 |
| 2,642,487 | Schroder | June 16, 1953 |